United States Patent
Cairns et al.

[19]

[11] Patent Number: 6,067,395
[45] Date of Patent: *May 23, 2000

[54] UNDERWATER BULKHEAD FEEDTHROUGH ASSEMBLY

[75] Inventors: James L. Cairns; Stewart M. Barlow, both of Ormond Beach, Fla.

[73] Assignee: Ocean Design, Inc., Ormond Beach, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/856,928

[22] Filed: May 15, 1997

[51] Int. Cl.$^7$ ............................................ G02B 6/38
[52] U.S. Cl. .................... 385/138; 385/136; 385/139; 385/70; 385/72
[58] Field of Search .................... 385/134, 138, 385/70, 71–72, 139, 136

[56] References Cited

U.S. PATENT DOCUMENTS

| | | | |
|---|---|---|---|
| 4,203,640 | 5/1980 | Bice et al. | 339/41 |
| 4,325,607 | 4/1982 | Carlsen | 385/70 |
| 4,373,767 | 2/1983 | Cairns | 339/94 |
| 4,531,810 | 7/1985 | Carlsen | 385/33 |
| 4,606,603 | 8/1986 | Cairns | 385/58 |
| 4,666,242 | 5/1987 | Cairns . | |
| 4,668,045 | 5/1987 | Melman et al. | 385/70 |
| 4,682,848 | 7/1987 | Cairns et al. . | |
| 4,959,022 | 9/1990 | Neuroth . | |
| 5,113,475 | 5/1992 | Baker | 385/138 |
| 5,155,795 | 10/1992 | Wasserman et al. | 385/138 |
| 5,203,805 | 4/1993 | Cairns | 439/199 |
| 5,358,418 | 10/1994 | Carmichael | 439/190 |
| 5,450,519 | 9/1995 | Iwanski et al. | 385/138 |
| 5,515,465 | 5/1996 | Olin et al. | 385/64 |
| 5,521,998 | 5/1996 | Walles et al. | 385/86 |
| 5,585,914 | 12/1996 | Yamasaki et al. | 356/44 |
| 5,588,086 | 12/1996 | Fan | 385/138 |
| 5,644,673 | 7/1997 | Patterson | 385/138 |

*Primary Examiner*—Rodney Bovernick
*Assistant Examiner*—Ellen E. Kim
*Attorney, Agent, or Firm*—Brown, Martin, Haller & McClain, LLP

[57] ABSTRACT

A bulkhead feedthrough assembly has a first end for releasable mating engagement with an underwater cable, a second end for releasable mating engagement in a bulkhead opening, and a through bore for guiding a plurality of leads from the cable through the bulkhead opening. A seal member is releasably mounted in the bore, and has a plurality of through bores equal to the number of leads, each lead extending through a respective bore. The seal member in an unstressed condition has an outer diameter greater than the feedthrough bore diameter, and each of the seal member through bores has an unstressed diameter less than the diameter of the respective lead, so as to resist leakage of seawater past the seal member.

11 Claims, 2 Drawing Sheets

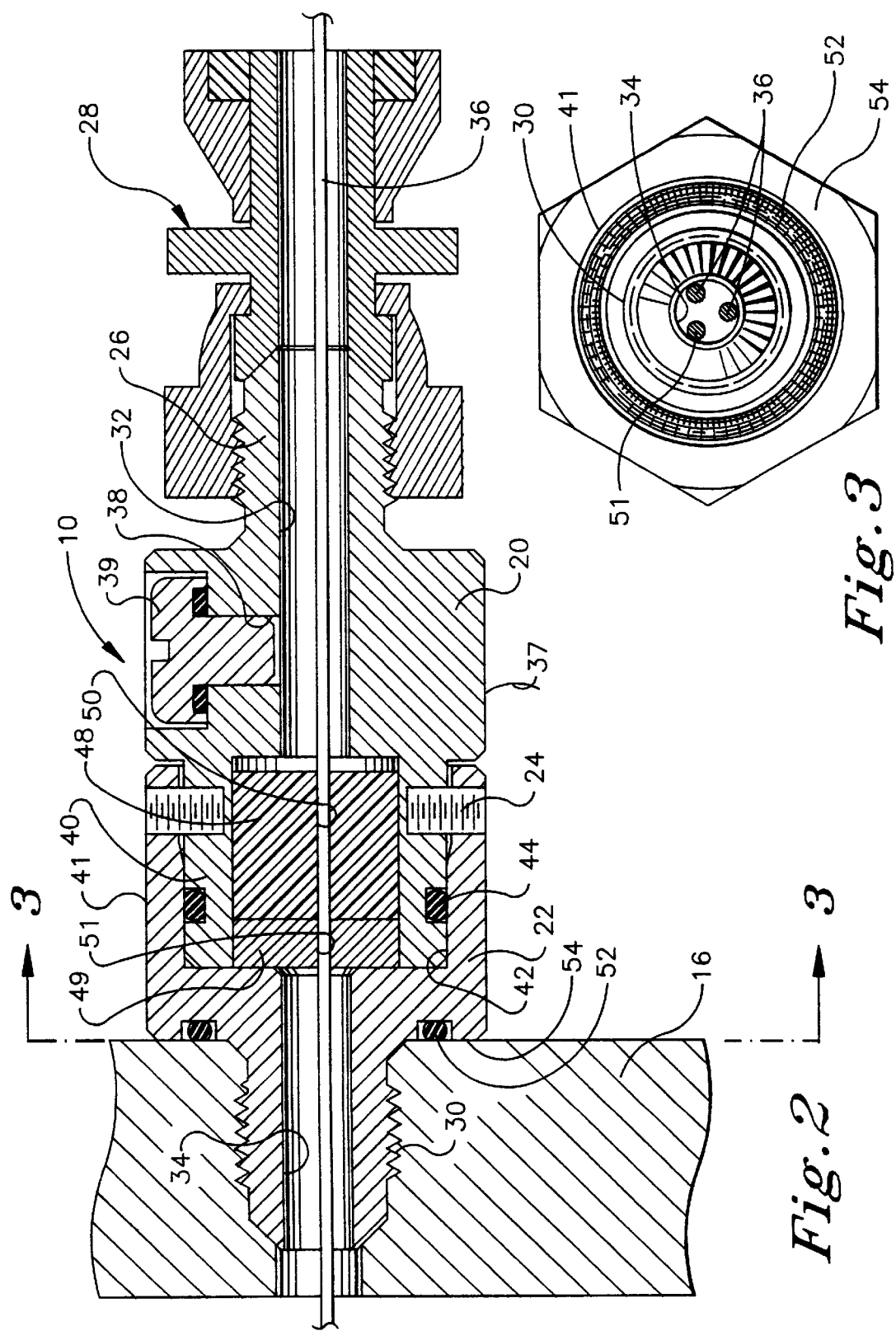

UNDERWATER BULKHEAD FEEDTHROUGH ASSEMBLY

BACKGROUND OF THE INVENTION

The present invention relates generally to sealed bulkhead feedthrough units or assemblies for feeding optical fibers and/or electrical leads from underwater cables through a bulkhead into an equipment housing for connection to components in the housing, or for example, through the bulkhead of a submarine.

A bulkhead feedthrough assembly has a first end for coupling to an underwater cable and a second end for coupling to a port in a bulkhead, and has a through bore for feeding optical fibers and electrical leads through the assembly into the housing. However, the fibers and/or leads must be sealed in the through bore in order to prevent seawater from entering the housing should there be a cable leak or other failure outside the housing. Up to now, feedthrough bores have generally been sealed by filling the space around the fibers or leads with epoxy cement, or by using "stuffing tubes" which are high-stress packing glands. Each of these methods is subject to several disadvantages. For epoxy-filled bores, for example, once the bore is filled with epoxy, the connection is permanent and the cable can no longer be disconnected, moved, or adjusted. Secondly, the epoxy can create pressure points on optical fibers, which in turn can distort the fibers and possibly block passage of light signals through the fibers. For packing glands, the extreme forces required to compact the gland material enough to form a pressure-tight seal distorts and compresses the sometimes fragile elements (i.e. optical fibers) that pass through it, thereby creating destructive stresses.

SUMMARY OF THE INVENTION

It is one object of the present invention to provide a new and improved bulkhead feedthrough sealing assembly. A second object of the present invention is to provide low-stress feedthrough seals for optical fibers and electrical leads. A third object of the invention is to provide feedthrough seals which are mechanically assembled, as opposed to being potted, for instance, and which are dismountable. A forth object of the present invention is to provide feedthrough seals which allow manipulation of the leads which pass through them.

According to one aspect of the present invention, a seal assembly for a bulkhead feedthrough unit is provided, which comprises a cylindrical or other regular-shaped seal member for fitting in a bore or other regular-shaped passage in a first part of a bulkhead feedthrough unit, the seal member having outer seal dimensions greater than the corresponding outer seal-seat dimensions in which it is to be fitted, and the seal member having a plurality of through passages equal in number to the number of electrical and/or fiber-optic leads to be fed through the unit into a housing, each passage having an unstressed diameter less than the diameter of the respective lead.

According to another aspect of the invention, a bulkhead feedthrough assembly is provided, which comprises a housing having a first end for releasable mating engagement with an underwater cable and a second end for releasable mating engagement in a bulkhead opening, the housing having a through bore for guiding a plurality of leads from the cable through the bulkhead opening, and a seal member mounted in the bore, the seal member having a plurality of through bores equal to the number of leads, each lead extending through a respective bore, and the seal member in an unstressed condition having an outer diameter greater than the housing through bore diameter, and each of the seal member through bores in the unstressed condition having a diameter less than the diameter of the respective lead.

In a preferred embodiment of the invention, the feedthrough housing is in two parts which are releasably secured together, comprising a female part having a counter bore coaxial with the through bore, a male part having a projection for engagement in the counter bore, and a fastener releasably securing the male and female parts together. The projection in the male part also has a counter bore of larger diameter than the remainder of the housing through bore, and the seal member is mounted in the counter bore to restrict or prevent leakage of seawater past the seal member into the interior of the bulkhead. Preferably, the seal member is mounted in the inner end of the counter bore and a back-up bushing is mounted at the outer end of the counter bore. The back-up bushing has an equal number of through bores to the seal member positioned in alignment with the seal member through bores, and each lead projects through the aligned bores in the seal member and back-up bushing.

The seal member is preferably a so-called Morrison-type seal which is compressed both inwardly at the engagement between the housing bore and the seal member, and outwardly at the engagement between each through lead and the respective seal through bore. This provides a good seal to resist ingress of high pressure seawater when the assembly is installed in an underwater environment, and, at the same time, has such light engagement that it does not tend to compress the leads projecting through the seal member. This is particularly important where some or all of the leads are optical fibers, since it reduces the risk of compression and distortions potentially reducing or cutting off the optical signal path through the bulkhead

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 2 is a longitudinal cross-section through the feedthrough assembly illustrating a seal device according to a preferred embodiment of the invention; and FIG. 3 is a front end view of the assembly on the lines 3—3 of FIG. 2.

DESCRIPTION OF THE PREFERRED EMBODIMENT

Figure 1:
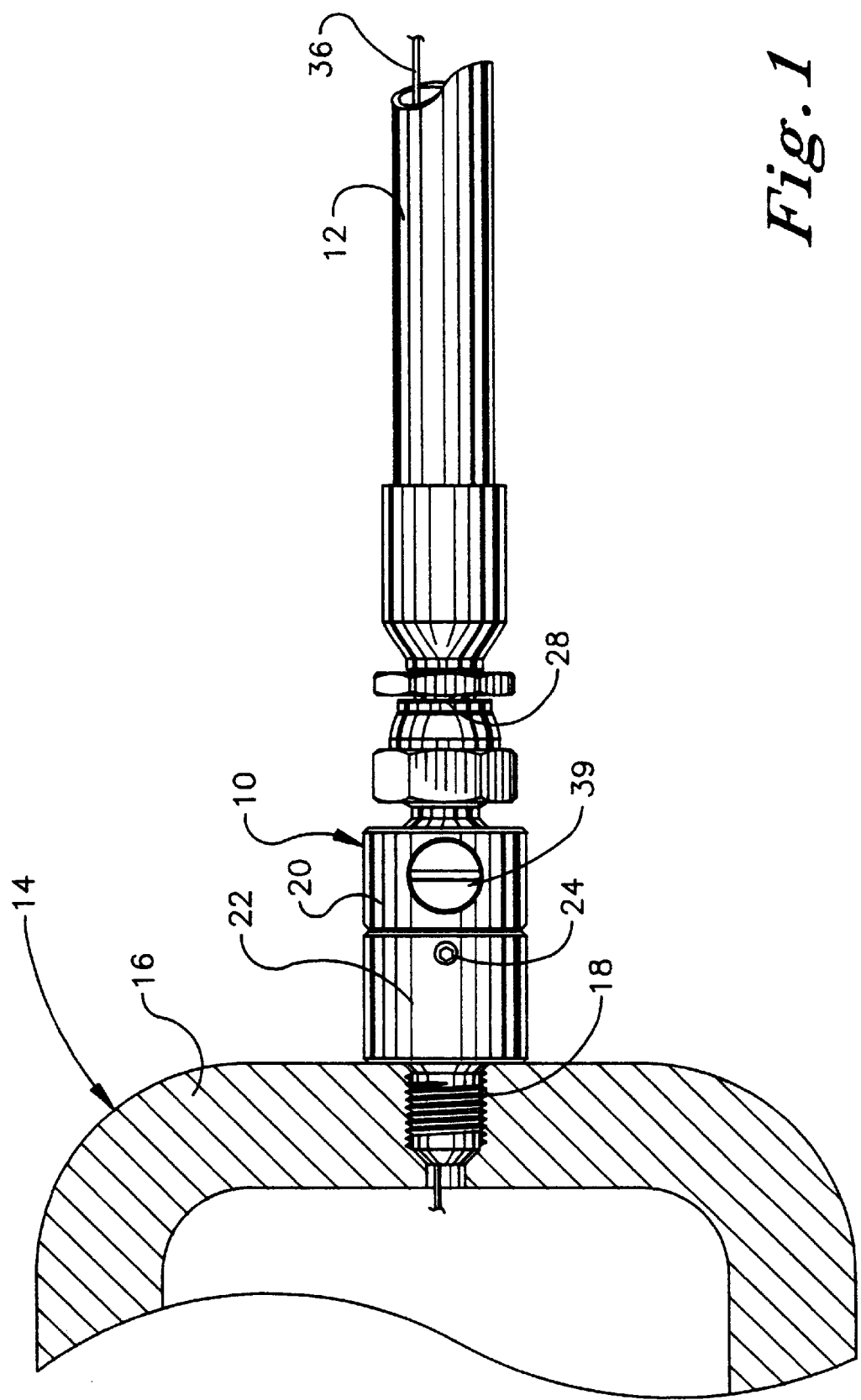
FIG. 1 is a partial sectional view of a bulkhead feedthrough assembly connected to a bulkhead inlet bore.

FIGS. 1–3 of the drawings illustrate a bulkhead feedthrough assembly 10 according to a preferred embodiment of the present invention for feeding fiber-optic and/or electrical leads within underwater cable 12 into an underwater housing 14 through bulkhead 16. Housing 14 will contain various types of optical and/or electrical circuits depending on the particular underwater application, as will be understood by those skilled in the field. The interior of housing 14 will be at low pressure while it is surrounded by high pressure seawater, so it is important to provide a good seal at the inlet bore 18 leading into housing 14.

The feedthrough assembly is in two parts, comprising a main body or male part 20 and a bulkhead coupling sleeve or female part 22 secured to the main body via socket head set 24. The main body 20 has a threaded end portion 26 for coupling directly with cable 12 or to a conventional swivel joint 28, as illustrated in FIGS. 1 and 2. The coupling sleeve 22 has a threaded end portion 30 for threaded engagement in housing inlet bore 18. The two parts 20 and 22 have aligned bores 32,34, respectively, through which optical fiber leads 36 and/or electrical leads (not illustrated) extend uninterrupted from cable 12 into housing 14 for connection to the appropriate components within the housing. In the illustrated embodiment, the feedthrough unit couples three optical fibers into housing 14. However, it will be understood that, in alternative embodiments, a greater or lesser number of optical fibers, either alone or in addition to electrical leads, may be coupled by a unit 10 into housing 14 as required by the particular application.

Main body 20 has an enlarged central ring 37 in which an oil fill bore 38 is located. Bore 38 is normally closed and sealed by a conventional oil fill cap 39. A reduced diameter cylindrical end portion 40 projects from central ring 37. Coupling sleeve 22 has an enlarged hexagonal tightening portion 41 with an enlarged counter bore 42 into which the end portion 40 of the main body projects. An O-ring seal 44 is provided between end portion 40 and counter bore 42. End portion 40 also has an enlarged bore portion or counter bore 46 into which a cylindrical seal member 48 and a back-up bushing 49 are fitted.

Seal member 48 and bushing 49 are each provided with a plurality of aligned through bores 50,51 respectively through which the respective optical fibers 36 and/or electrical leads extend. Preferably, seal member 48 is a so-called Morrison-type seal. A Morrison-type seal is a seal which is dimensioned so as to have both inward and outward interference on a part over which it extends and on the bore within which it is mounted, respectively. A Morrison-type seal having a single through bore, in an unstressed or uncompressed condition, will have an inner diameter smaller than the diameter of the part or shaft over which it is to be fitted and an outer diameter larger than the diameter of the bore into which it is to be fitted. Thus, when the seal is fitted over the shaft and into the bore, it is compressed or stressed in opposite radial directions, ensuring good sealing engagement between the seal and the inner shaft and between the seal and the outer bore surface. The properties and principles of operation of such seals are described in a paper entitled "An Investigation of Cable Seals", by J. B. Morrison, Applied Physics Laboratory, University of Washington, Report #54-41, Mar. 1, 1954.

Seal member 48, unlike conventional Morrison seals, has a plurality of through bores 50 through which plural fibers 36 (and/or electrical leads) extend, and acts as a gland to fill the space between the fibers and the through bore so that seawater cannot enter the housing. As noted above, both the bulkhead feedthrough assembly and the cable 12 may be oil-filled and pressure compensated, and thus the seal member 48 will not normally be exposed to seawater. However, in the event of a cable leakage or a failure in the bulkhead assembly, it is possible that high pressure seawater could enter the bore 32.

In the past, bulkhead feedthrough unit bores have been filled with epoxy around the electrical or fiber-optical leads in order to prevent seawater from leaking into the housing. However, this has disadvantages since the epoxy can create pressure points in the fibers, which in turn can create distortions restricting or preventing passage of optical signals through the fibers. Also, the feedthrough unit can no longer be adjusted or moved when filled with epoxy, unlike the seal assembly of this invention which does permit disassembly for maintenance or other purposes.

Conventional packing glands depend on the packing material to be mechanically compressed to a pressure exceeding the operation pressure in order to function, and that requirement often causes unacceptable stresses in the leads which pass through them.

A further O-ring seal 52 is also provided on the end face or shoulder 54 of the female part or coupling sleeve 22. This seals against the outer face 56 of the bulkhead when the threaded end portion 30 is screwed into the bulkhead opening as illustrated in FIG. 2. Once the parts are assembled as illustrated in FIG. 2, the seal member 48 will effectively prevent leakage of seawater into the enclosure inside bulkhead 16. Any seawater leaking into the cable downstream of bulkhead assembly 10 will impinge against the outer end face of the seal member 48. However, equal pressures outwardly and inwardly will be created at the junction between each of the leads 36 and the respective bores and at the junction between the outer surface of the seal member and the inner surface of counter bore 42, canceling out and tending to resist any tendency for the seal to lift away from any of the surfaces. This equal interference in both directions provides an effective seal against any seawater ingress past the bulkhead 16. The seal member 48 is of any suitable resilient material, such as soft rubber.

Although a preferred embodiment of the invention has been described above by way of example only, it will be understood by those skilled in the field that modifications may be made to the disclosed embodiment without departing from the scope of the invention, which is defined by the appended claims.

We claim:

1. A seal device for a bulkhead feedthrough assembly guiding a plurality of leads through a bulkhead via the feedthrough assembly, the seal device comprising:

a seal member adapted to fit in a seat in a bulkhead feedthrough assembly, the seal member having an outer flat end face spaced from an outer end of the seat, and having outer dimensions in an unstressed condition which are greater than the respective dimensions of the seat in which it is to be fitted;

the seal member having a plurality of cylindrical through bores equal in number to the number of leads to be fed through the feedthrough assembly, each bore being of uniform diameter along its length and having an unstressed diameter less than the diameter of the respective lead, each through bore comprising means for sealing directly against the smooth outer surface of a lead comprising an electrical wire or optical fiber with the lead extending completely through the seal member and beyond its outer end face; and a back-up bushing adapted to fit in the seat in the bulkhead feedthrough assembly adjacent the seal member and between the flat end face of the seal member and the outer end of the seat, the bushing having a flat inner end face in face-to-face engagement with the flat end face of the seal member, the bushing having the same number of through bores as the seal member, the bushing bores being positioned for alignment with the seal member bores, and each having a diameter substantially equal to the outer diameter of the lead, whereby each lead can be fed completely through a respective pair of aligned bores in the seal member and back-up bushing.

2. The device as claimed in claim 1, wherein the seal member is a Morrison-type seal.

3. The device as claimed in claim 1, wherein the seal member is of soft rubber material.

4. The device as claimed in claim 1, wherein the seal member is of cylindrical shape and has an outer diameter in an unstressed condition which is greater than the seat diameter.

5. A bulkhead feedthrough assembly, comprising:

a housing having a first end for releasable mating engagement with an end of an underwater cable and a second end for releasable mating engagement in a bulkhead opening;

the housing having a through bore for guiding a plurality of leads out of the end of the cable and through the bulkhead opening, and the through bore having an enlarged, rigid seat adjacent the second end of said housing, the seat being of larger diameter than said bore;

a plurality of smooth, continuous and unbroken, cylindrical leads extending from the end of the cable through the first end of the housing and completely through the through bore from one side of the bulkhead to the opposite side;

a solid seal member of resilient material mounted in the seat, the seal member having opposite flat end faces, the seal member having a plurality of cylindrical through bores equal to the number of leads, each through bore in the seal member being of uniform diameter along its length, each lead extending completely through a respective bore and outwardly beyond the opposite end face of the seal member, the seal member bores being in sealing engagement with the smooth outer cylindrical surfaces of the respective leads, and the seal member having an outer surface adapted for sealing engagement with said seat to seal the housing through bore; and the seal member in an unstressed condition having an outer cross-sectional dimension greater than the corresponding dimension of the housing seat, and each of the seal member through bores in an unstressed condition having a diameter less than the diameter of the respective lead.

6. The assembly as claimed in claim 5, wherein at least some of the leads are optical fibers.

7. The assembly as claimed in claim 5, wherein the feedthrough housing comprises a fixed female part having a first end for attachment to the bulkhead so as to project outwardly from one side of the bulkhead, and a second, outer end, and a second, male part for attachment to a cable, the female part having a counterbore coaxial with the housing through bore projecting inwardly from said second end and the male part having a projection for engagement in the counterbore, the projection terminating short of said first end of said female part and said bulkhead, such that said male part projects outwardly away from said bulkhead and female part, and a fastener releasably securing the male and female parts together.

8. The assembly as claimed in claim 7, wherein said seat is located in the projection in the male part, and the seal member is mounted in the seat of the male part to restrict or prevent leakage of seawater past the seal member into the interior of the bulkhead.

9. The assembly as claimed in claim 5, wherein the seal member is a Morrison-type seal.

10. The assembly as claimed in claim 5, wherein said seat is a cylindrical counter bore, and said seal member is cylindrical.

11. A bulkhead feedthrough assembly, comprising:

a housing having a first end for releasable mating engagement with an underwater cable and a second end for releasable mating engagement in a bulkhead opening;

the housing having a through bore for guiding a plurality of leads from the cable through the bulkhead opening;

the housing comprising a first, female part for attachment to the bulkhead and a second, male part for attachment to a cable, the female part having a counterbore coaxial with the housing through bore, the counterbore having a flat inner end face, the male part having a projection for engagement in the counterbore, and a fastener releasably securing the male and female parts together;

the projection having an open outer end engaging the inner end face of said counterbore, and a cylindrical, rigid seat extending inwardly from said open outer end co-axial with said through bore;

a solid, cylindrical seal member of resilient material mounted in the seat, the seal member having opposite, flat end faces, the seal member having a plurality of through bores equal to the number of leads, each lead extending through a respective bore, the seal member bores being adapted for sealing engagement with the respective leads, and the seal member having an outer surface adapted for sealing engagement with said seat to seal the housing through bores;

the seal member in an unstressed condition having an outer diameter greater than the housing seat diameter, whereby said seal member in said seat restricts leakage of seawater past the seal member into the interior of the bulkhead, and each of the seal member through bores in an unstressed condition having a diameter less than the diameter of the respective lead; and the seat in the projection of the male part having an inner end, the seal member having a length less than the length of said seat and extending from said inner end to a location spaced from the open outer end of said seat, and a rigid back-up bushing mounted at the outer end of the seat to extend between a flat end face of the seal member and the inner end face of said counterbore, the back-up bushing having opposite flat end faces engaging against the flat end face of the seal member and the inner end face of said female part counterbore, respectively, the back-up bushing having an equal number of through bores to the seal member positioned in alignment with the seal member through bores, each lead projecting through a respective pair of aligned bores in the seal member and back-up bushing.

* * * * *